United States Patent
Tai et al.

(10) Patent No.: US 7,648,406 B2
(45) Date of Patent: Jan. 19, 2010

(54) CARBON NANOTUBE ARRAY ELEMENT AND METHOD FOR PRODUCING THE SAME

(75) Inventors: Nyan-Hwa Tai, Hsinchu (TW); Chien-Chao Chiu, Taipei Hsien (TW); Tsung-Yen Tsai, Changhua Hsien (TW)

(73) Assignee: National Tsing Hua University, Hsinchu (TW)

( * ) Notice: Subject to any disclaimer, the term of this patent is extended or adjusted under 35 U.S.C. 154(b) by 497 days.

(21) Appl. No.: 11/637,811

(22) Filed: Dec. 13, 2006

(65) Prior Publication Data

US 2007/0284986 A1 Dec. 13, 2007

(30) Foreign Application Priority Data

Jun. 13, 2006 (TW) .............................. 95120963 A (51) Int. Cl.
*H01J 9/02* (2006.01)
*H01J 1/304* (2006.01)

(52) U.S. Cl. .............................. 445/50; 445/49; 445/51; 423/447.1

(58) Field of Classification Search .................. 445/49, 445/50, 51; 423/447.1
See application file for complete search history.

(56) References Cited

U.S. PATENT DOCUMENTS

| | | | |
|---|---|---|---|
| 6,756,025 B2 * | 6/2004 | Colbert et al. ........... | 423/447.3 |
| 2002/0074932 A1 * | 6/2002 | Bouchard et al. ........... | 313/495 |
| 2006/0057388 A1 * | 3/2006 | Jin et al. ..................... | 428/408 |

* cited by examiner

*Primary Examiner*—Nimeshkumar D. Patel
*Assistant Examiner*—Anthony T Perry
(74) *Attorney, Agent, or Firm*—Cooley Godward Kronish LLP (57) ABSTRACT

A method for producing a carbon nanotube array element includes the steps of: providing a first substrate coated with a conductive paste layer; forming an array of thin film blocks of catalyst on a second substrate; forming each of the thin film blocks into islands of catalyst; forming carbon nanotube bundles on the islands of catalyst, each of the carbon nanotube bundles including a plurality of carbon nanotubes and having a free end portion; pressing the second substrate toward the first substrate such that the free end portions insert into the conductive paste layer; solidifying the conductive paste layer; and removing the second substrate together with the islands of catalyst from the carbon nanotube bundles, thereby forming an open end for each of the carbon nanotubes. A carbon nanotube array element for a field emission cathode device is also disclosed.

6 Claims, 10 Drawing Sheets

CARBON NANOTUBE ARRAY ELEMENT AND METHOD FOR PRODUCING THE SAME

CROSS-REFERENCE TO RELATED APPLICATION

This application claims priority of Taiwanese application no. 095120963, filed on Jun. 13, 2006.

BACKGROUND OF THE INVENTION

1. Field of the Invention

This invention relates to a method for producing a field emission cathode device, more particularly to a method for producing a carbon nanotube array element of a field emission cathode device and the carbon nanotube array element produced therefrom.

2. Description of the Related Art

Carbon nanotube (CNT) has excellent electrical, mechanical, chemical, physical, and thermal properties because of inert and perfect graphene structure and high aspect ratios. In particular, CNT is applied to produce a field emission display device because of low turn-on and threshold voltage. CNT grown by chemical vapor deposition (CVD) techniques is used as an electron emission source. After externally applying a voltage, electrons are emitted from CNT tips and hit an anode (e.g., indium tin oxide substrate having phosphor coating) to generate light. Under an applied voltage of 3 V/μm, the current density is 1 mA/cm$^2$, and the lifetime is up to ten thousands hours. Moreover, compared to other displays, the field emission display (FED) has advantages of high brightness, wide view angle, small thickness, and low energy consumption.

Presently, a vertically aligned CNT array element of a field emission cathode is produced using a template forming method or a screen-printing method.

The template forming method includes providing a substrate having a porous surface, depositing a catalyst layer on the porous surface of the substrate, and placing the substrate with the catalyst layer in a chemical vapor deposition (CVD) furnace with proper controlling of temperature, pressure, and concentration of hydrocarbon gas. Parallel carbon nanotube bundles can be found on the substrate. Examples of the template forming method can be found in U.S. Pat. Nos. 6,512,235 B1 and 6,339,281 B2. Although the carbon nanotubes produced by this method have good alignment, adhesion between the CNTs and the substrate is poor and might result in separation during the field emission operation at high voltage (600 V or more).

To overcome the adhesion problem encountered in the template forming method, a screen-printing method is proposed. A CNT paste consisting of organic bonding agent, resin (e.g., epoxy), carbon nanotubes (CNTs), and silver powder is coated on a substrate using a screen-printing method so as to produce a carbon nanotube field emission cathode having a plurality of electron emitters. The relevant information can be found in U.S. Pat. Nos. 6,436,221 B1, 6,342,276 B1, and 6,146,230. Although the adhesion problem is solved, the precision of the field emission cathode produced by the screen-printing method is easily degraded due to inappropriate thickness of an slurry, inappropriate pressure and improper viscosity of the CNT paste. Moreover, the CNTs in cathode made by the screen-printing method have a random arrangement, rather than a regular array.

Figure 1:
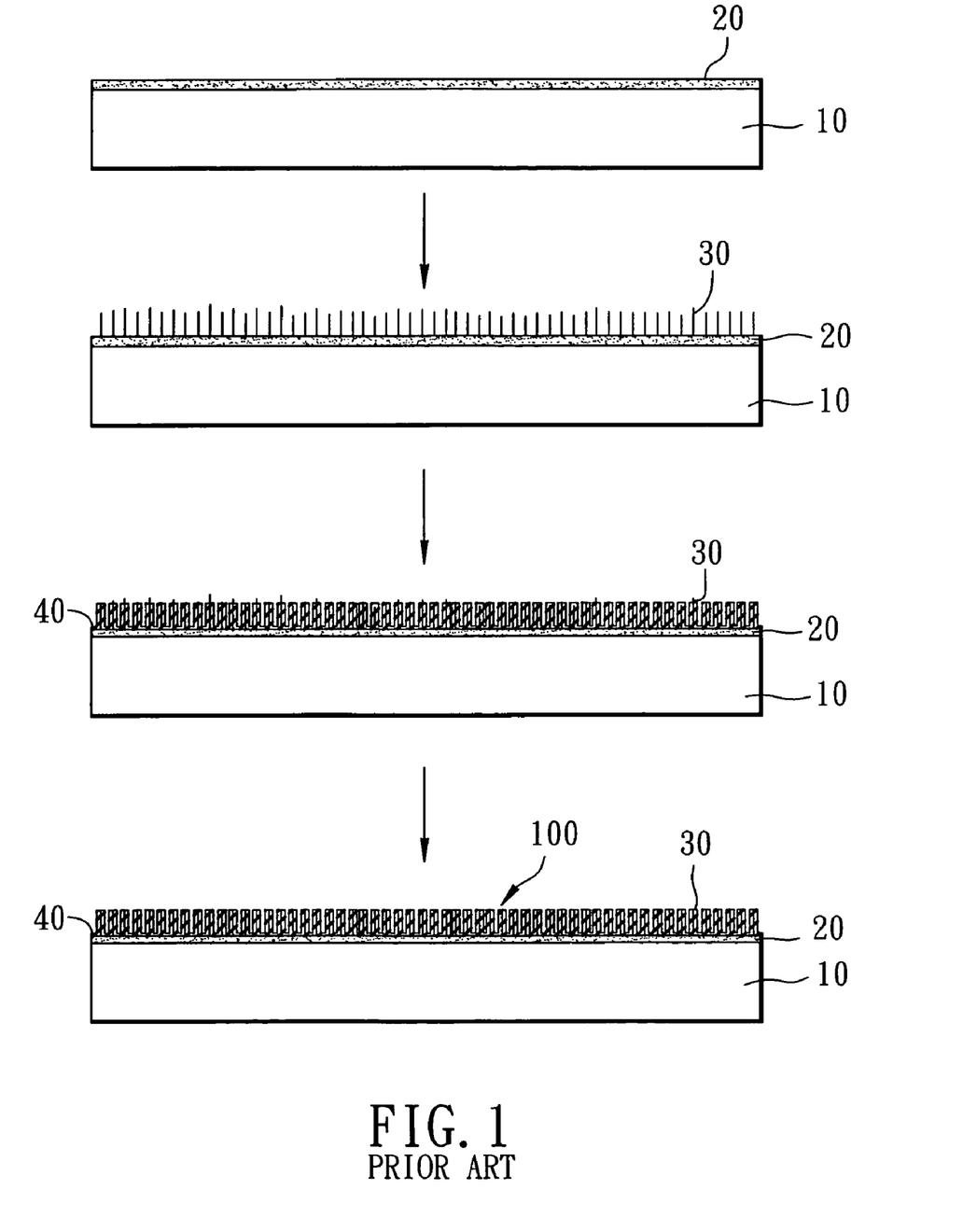
FIG. 1 illustrates consecutive steps of a method for producing a conventional carbon nanotube field emission device.

In consideration of the adhesion and the arrangement of CNTs, US 2005/0264155A1 discloses a method for producing a carbon nanotube field emission device 100. As shown in FIG. 1, a catalyst film 20 made from Fe, Co, or Ni is deposited on a substrate 10. The substrate 10 having the catalyst film 20 is placed in a reaction furnace at a temperature ranging from 500 to 800° C. to grow a carbon nanotube array 30 thereon. An adhesive 40 is injected into the carbon nanotube array 30. Furthermore, the surfaces of the carbon nanotube array 30 are treated by laser to remove the adhesive 40 so as to ensure exposure of each carbon nanotube. Finally, the carbon nanotube field emission device 100 having improved field emission property is obtained. However, the adhesive 40 coated on the carbon nanotubes can reduce the service life of the device 100.

In addition, Zhu L. et al. (NANO LETTERS, Vol 6, No. 2, pp 243-247, 2006) discloses a transfer method for a carbon nanotube including the following steps: forming a copper foil on a FR-4 board, sputtering an under bump metallization (UBM) layer on the substrate, stencil-printing an eutectic tin-lead solder having a thickness of 100 μm on the UBM layer, transferring a carbon nanotube film on a Si substrate onto the eutectic tin-lead solder, and removing the Si substrate. During transferring, the Si substrate and the FR-4 board were disposed in a reflow oven at 270° C. such that the eutectic tin-lead solder is melted. The melted eutectic tin-lead solder soaked into the carbon nanotube film so as to improve the adhesion between the carbon nanotube film and the FR-4 board. Although the adhesion is improved, the requirement for the reflow oven increases complexity and difficulty of the process. Moreover, only a current density of 5 mA/cm$^2$ was obtained under the test conditions of less than 10$^{-5}$ Torr and 180 μm spacing between the CNT tip and an anode when an electric field of 3.4 V/μm was applied. The field emission property is insufficient for application and needs further improvement.

SUMMARY OF THE INVENTION

Therefore, the object of the present invention is to provide a method for producing a carbon nanotube array element of a field emission cathode device and the carbon nanotube array element produced therefrom that can overcome the aforesaid drawbacks of the prior art.

According to one aspect of this invention, a method for producing a carbon nanotube array element of a field emission cathode device, includes the steps of: providing a first substrate having a surface coated with a conductive paste layer; forming an array of thin film blocks of catalyst on a second substrate; forming each of the thin film blocks into islands of catalyst on the second substrate; forming carbon nanotube bundles on the islands of catalyst on the second substrate, each of the carbon nanotube bundles including a plurality of carbon nanotubes and having a free end portion distal from the second substrate; pressing the second substrate toward the first substrate such that the free end portions of the carbon nanotube bundles insert into the conductive paste layer; solidifying the conductive paste layer so as to fix the free end portions of the carbon nanotube bundles to the first substrate; and removing the second substrate together with the islands of catalyst from the carbon nanotube bundles fixed to the first substrate, thereby forming an open end for each of the carbon nanotubes.

According to another aspect of this invention, a carbon nanotube array element for a field emission cathode device includes a substrate, a conductive bonding layer of a conductive paste formed on the substrate, and an array of carbon nanotube bundles, each of which includes a plurality of carbon nanotubes and each of which has a free end portion inserting into the conductive bonding layer, each of the carbon nanotubes having an open end opposite to the conductive bonding layer.

According to yet another aspect of this invention, a carbon nanotube array element for a field emission cathode device includes a first substrate having a surface coated with a conductive paste layer, and an array of carbon nanotube bundles formed on the first substrate, the array of carbon nanotube bundles being formed by forming an array of thin film blocks of catalyst on a second substrate, each of the thin film blocks of catalyst has a size ranging from 10 μm×10 μm to 400 μm×400 μm; forming each of the thin film blocks into islands of catalyst on the second substrate; forming carbon nanotube bundles on the islands of catalyst on the second substrate, each of the carbon nanotube bundles including a plurality of carbon nanotubes and having a free end portion distal from the second substrate; pressing the second substrate toward the first substrate such that the free end portions of the carbon nanotube bundles insert into the conductive paste layer; solidifying the conductive paste layer so as to fix the free end portions of the carbon nanotube bundles to the first substrate; and removing the second substrate together with the islands of catalyst from the carbon nanotube bundles fixed to the first substrate, thereby forming an open end for each of the carbon nanotubes.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 8:
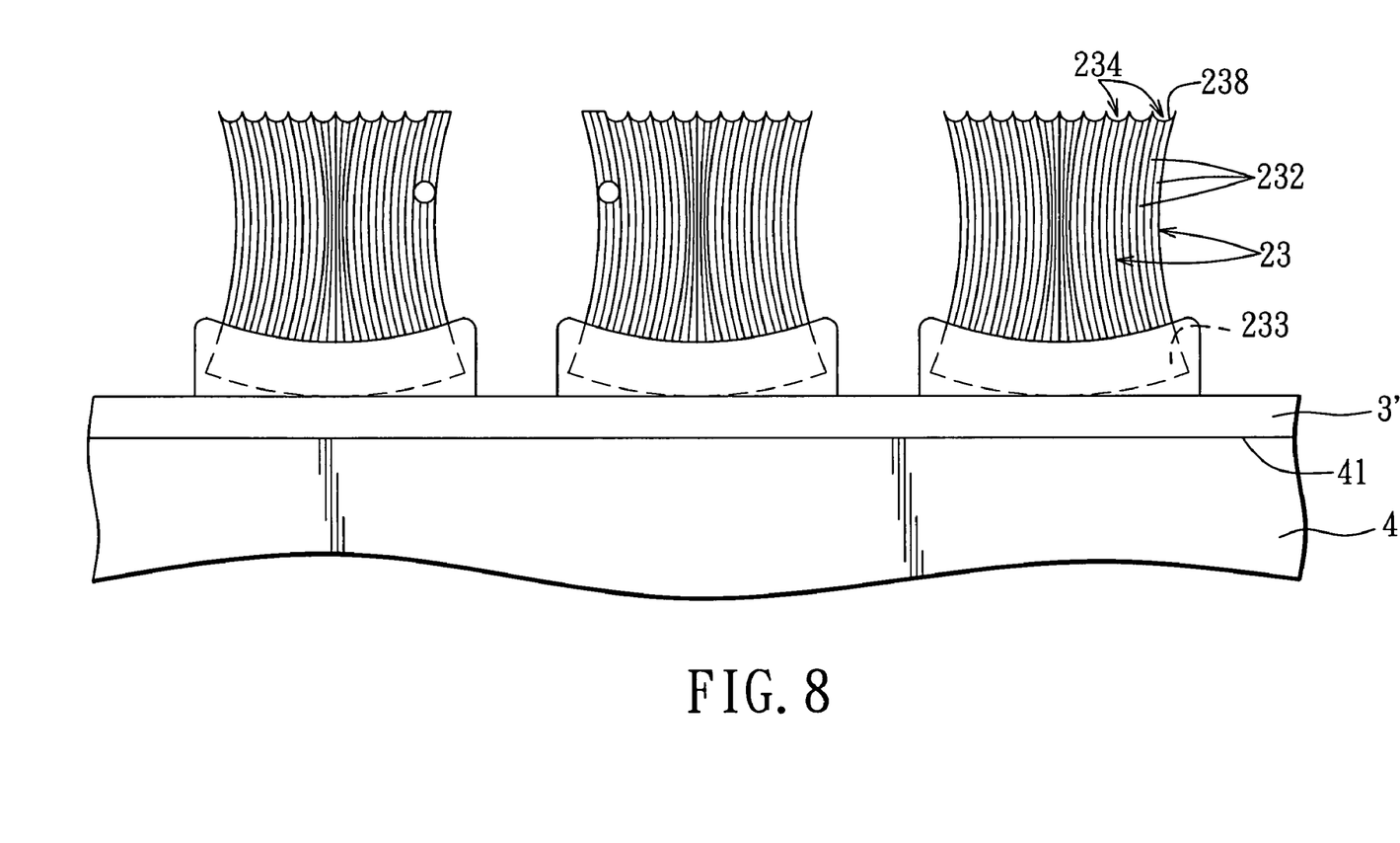
FIG. 8 is a schematic view of the preferred embodiment of a vertically aligned carbon nanotube array element for a field emission cathode device according to this invention.
Figure 13:
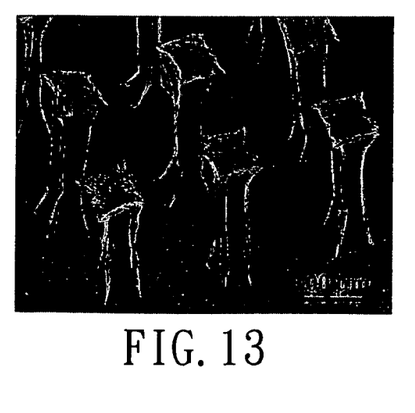

Referring to FIGS. 8 and 13, the preferred embodiment of a vertically aligned carbon nanotube array element for a field emission cathode device is shown to include a substrate 4, a conductive bonding layer 3 formed on a surface 41 of the substrate 4, and an array of vertically aligned carbon nanotube bundles 23. Each of the carbon nanotube bundles 23 includes a plurality of carbon nanotubes 232 and has a free end portion 233 inserting into the conductive bonding layer 3. Each of the carbon nanotubes 232 has an open end 238 opposite to the conductive bonding layer 3.

Figure 4:
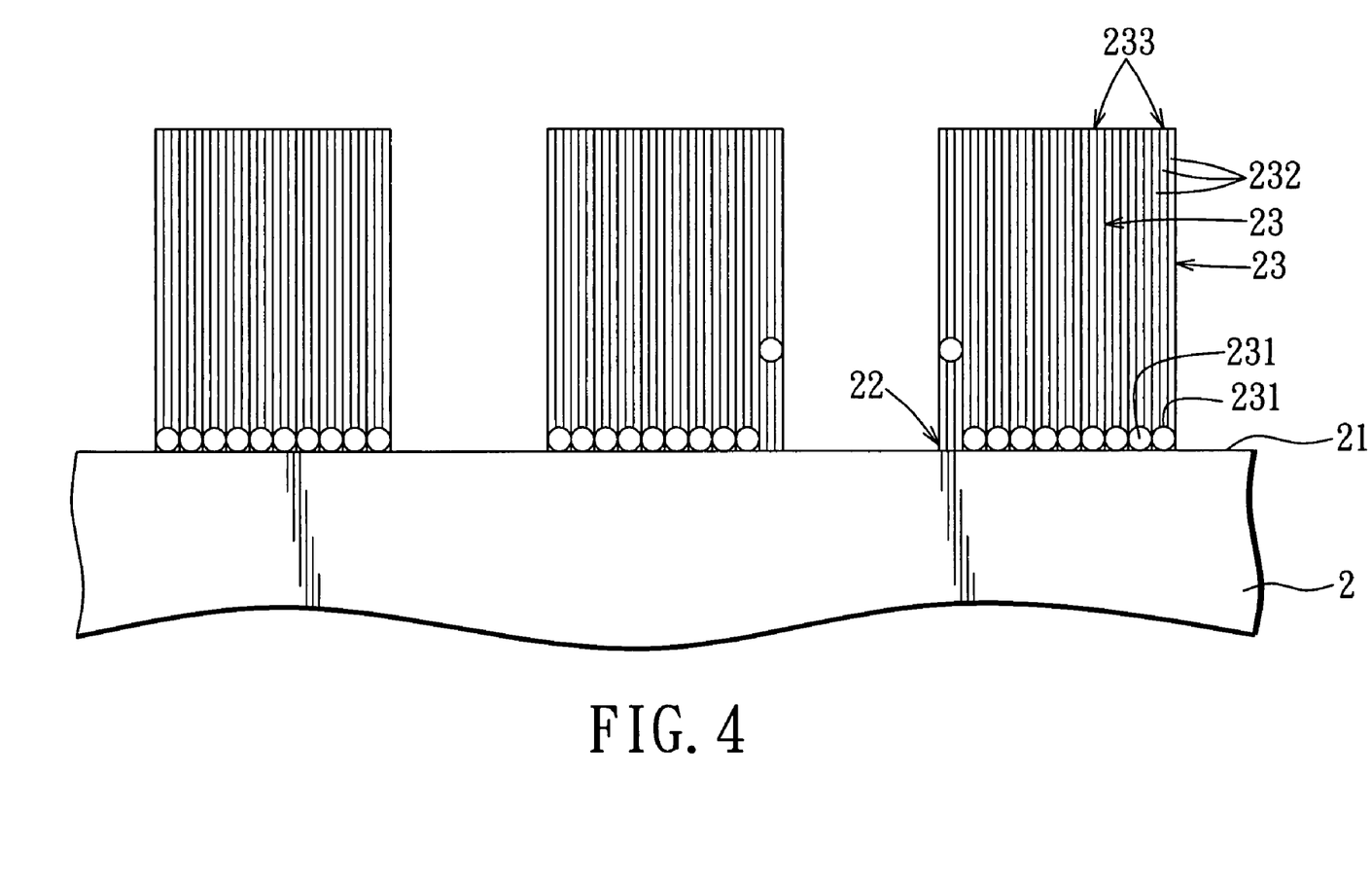
Figure 5:
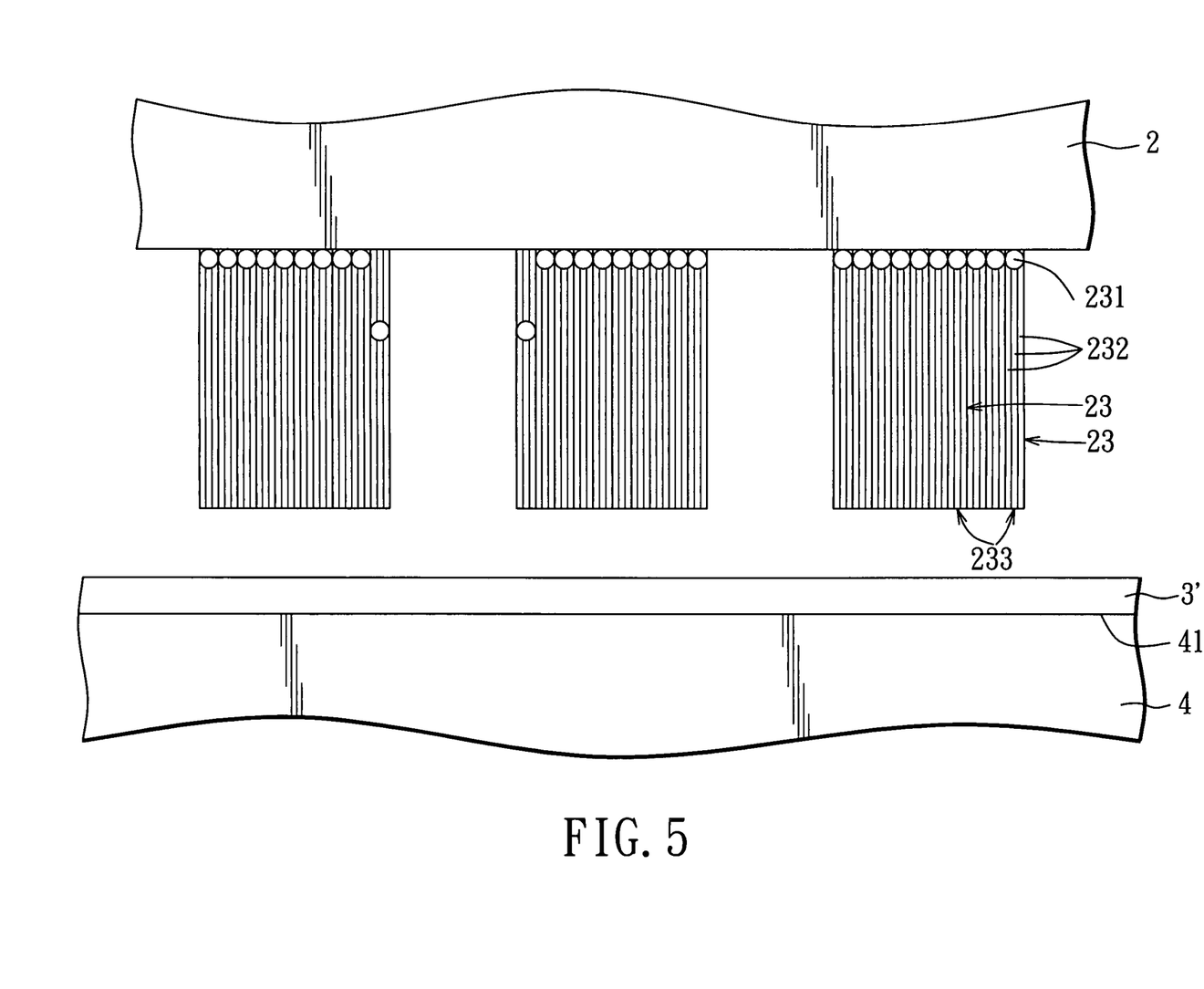
Figure 6:
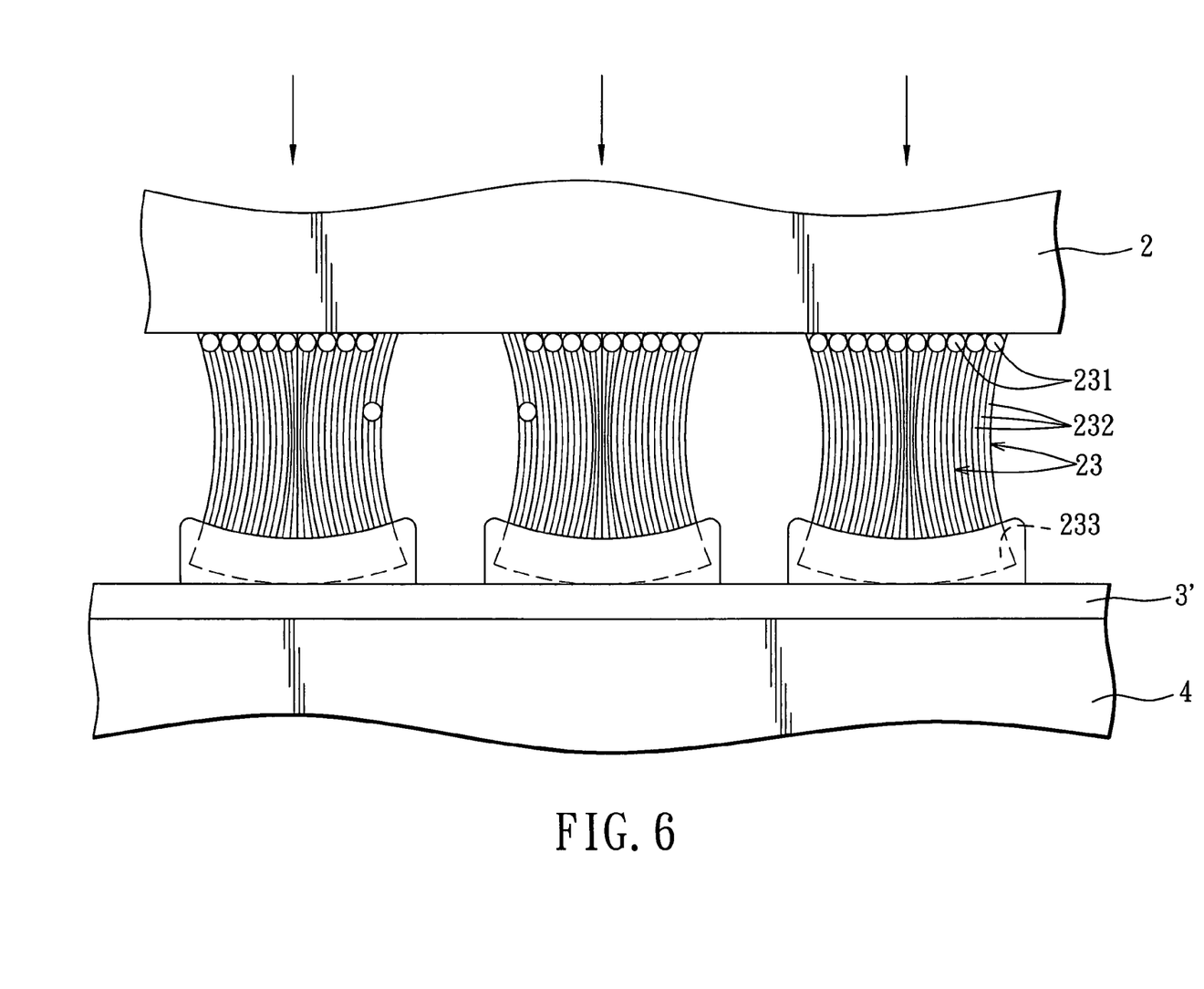
Figure 11:
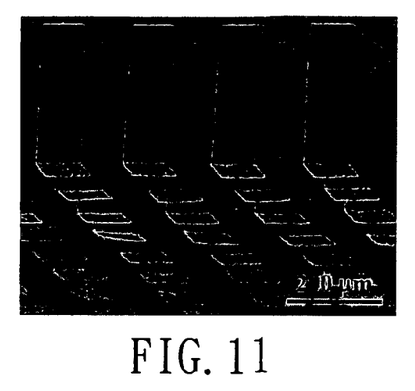
FIGS. 11 to 13 show SEM photographs corresponding to FIGS. 4, 6, and 8, respectively.
Figure 12:
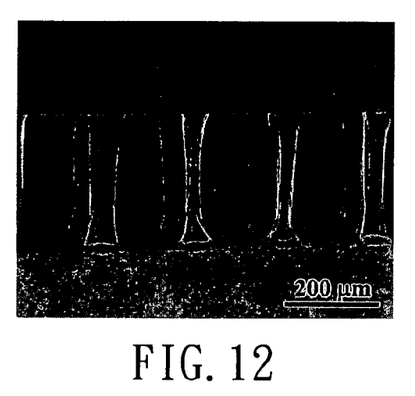

A method for producing the vertically aligned carbon nanotube array element of this invention includes the steps of:

(a) providing a first substrate 4 having a surface 41 coated with a conductive paste layer 3' (see FIG. 5); (b) forming an array of thin film blocks 22 of catalyst (e.g., iron catalyst) on a second substrate 2 (see FIGS. 2 and 3); (c) forming each of the thin film blocks 22 into islands of the iron catalyst 231 on the second substrate 2; (d) forming carbon nanotube bundles 23 on the islands of the iron catalyst 231 on the second substrate 2, each of the carbon nanotube bundles 23 including a plurality of carbon nanotubes 232 and having a free end portion 233 distal from the second substrate 2 (see FIGS. 4 and 11); (e) pressing the second substrate 2 toward the first substrate 4 such that the free end portions 233 of the carbon nanotube bundles 23 insert into the conductive paste layer 3' (see FIGS. 5, 6, and 12); (f) solidifying the conductive paste layer 3' so as to form a conductive bonding layer 3 to fix the carbon nanotube bundles 23 to the first substrate 4; and (f) removing the second substrate 2 together with the islands of the iron catalyst 231 from the carbon nanotube bundles 23 fixed to the first substrate 4, thereby forming an open end 238 for each of the carbon nanotubes 232 (see FIG. 7).

Figure 2:
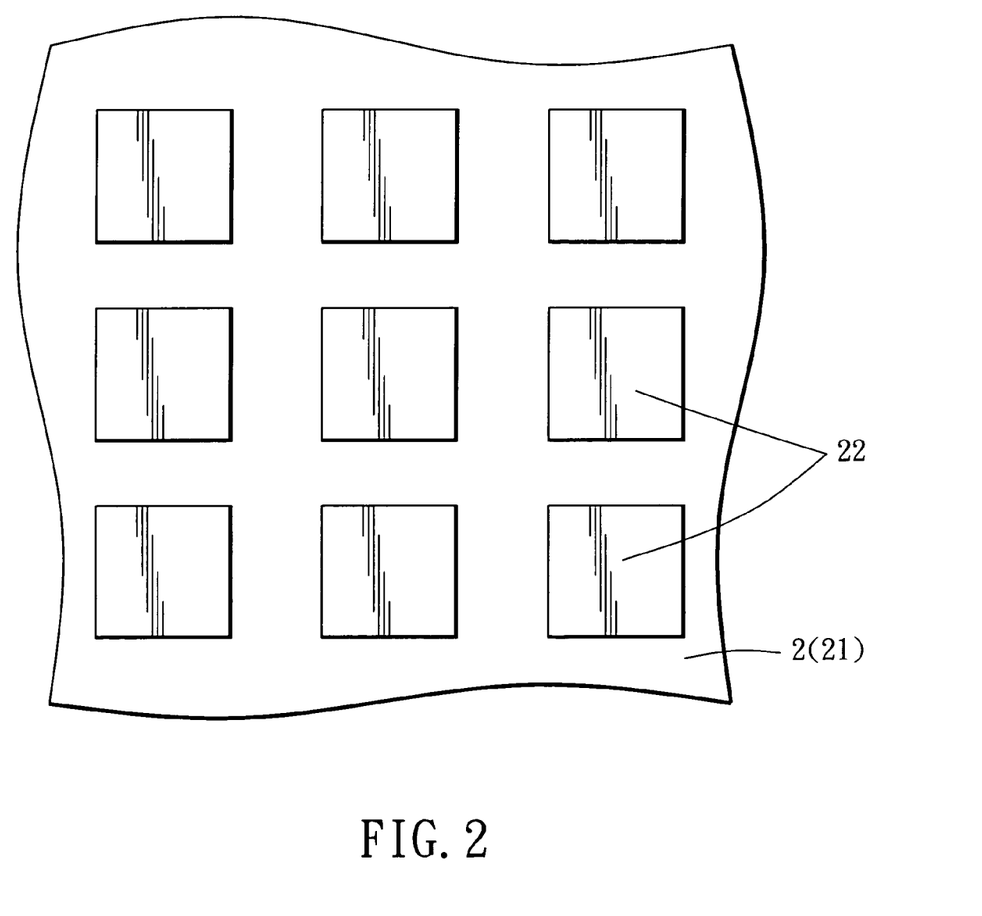
FIGS. 2 to 7 illustrate consecutive steps of the preferred embodiment of a method for producing a vertically aligned carbon nanotube array element of a field emission cathode device according to this invention.
Figure 3:
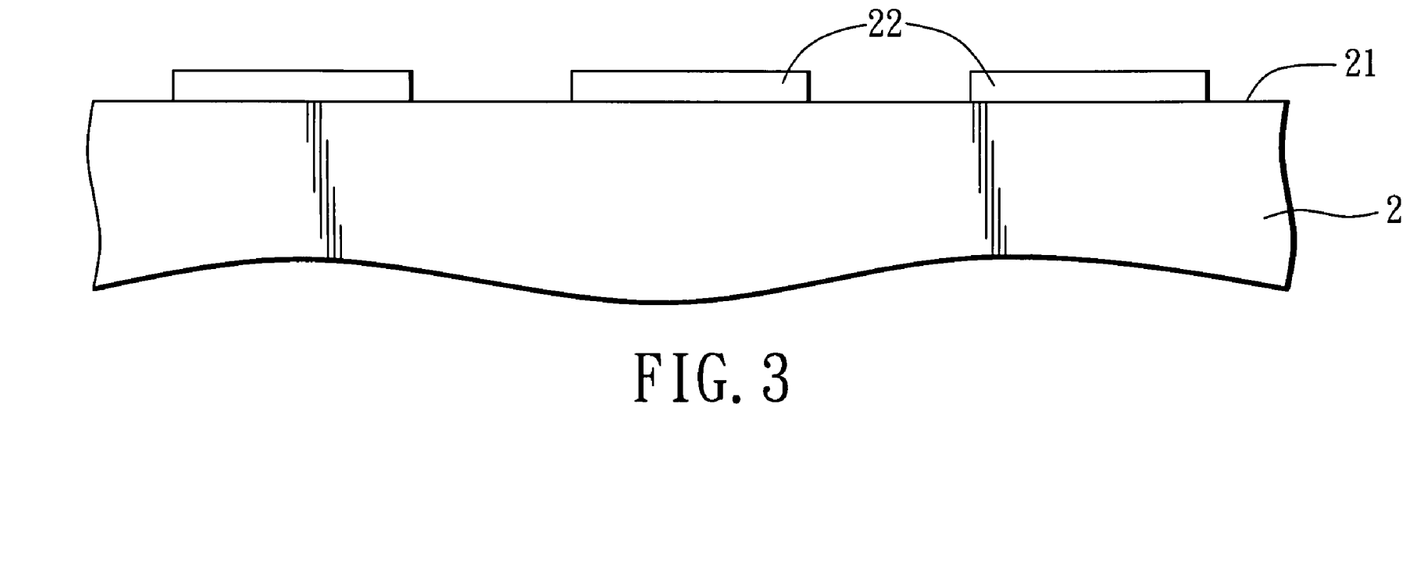

Formation of the array of the carbon nanotube bundles 23 on the second substrate 2 is performed using thermal CVD techniques in a chamber. Specifically, as shown in FIGS. 2 to 4, an array of iron thin film blocks 22 (having a layer thickness of 1.0 nm and containing iron catalyst 231) is formed on a surface 21 of the second substrate 2 (e.g., Si substrate) using sputtering techniques and a photolithography process. The second substrate 2 is then placed on a heater of a rapid heating and cooling system and is thermally annealed at 750 to 850° C. under a low pressure of 10 Torr with a flow rate of 30 sccm of 10 vol % $H_2$/Ar gas mixture for 5-10 minutes so as to form each of the iron thin film blocks 22 into islands of the iron catalyst 231. Acetylene as a carbon source is then introduced into the system at a flow rate of 60 sccm, and then decomposes and dissolves in the islands of the iron catalyst 231. When carbon concentration in the islands of the iron catalyst 231 is saturated, carbon is precipitated on the islands of the iron catalyst 231 so as to form the vertically aligned carbon nanotube bundles 23 on the islands on the second substrate 2. Each of the carbon nanotube bundles 23 is consisted of a plurality of well-aligned carbon nanotubes 232. The carbon nanotube bundles 23 thus formed were observed using a scanning electron microscope (SEM) and were shown in FIG. 11.

It should be noted herein that the iron thin film blocks 22 can be square, rectangular, circular, triangular, or polygonal in shape. In addition, the layer thickness of the iron thin film blocks 22, the annealing conditions (e.g., annealing pressure and the flow rate of the gas mixture), and the flow rate of the acetylene can vary based on actual requirements. For examples, the iron thin film blocks 22 can have a layer thickness ranging from 0.1 to 5 nm. The annealing pressure ranges from 1 to 100 Torr, and the flow rate of the gas mixture ranges from 5 to 100 sccm. The flow rate of the acetylene ranges from 5 to 100 sccm.

It should be noted that, when the viscosity of the conductive paste layer 3' is too large, the carbon nanotube bundles 23 are difficult to be inserted into the conductive paste layer 3' or the inserted depth of the carbon nanotube bundles 23 is too small such that the adhesion between the carbon nanotube bundles 23 and the first substrate 4 becomes poor. However, when the viscosity is too small, the area of the conductive paste layer 3' where the carbon nanotube bundles 23 are inserted is likely to disperse, thereby resulting in poor adhesion between the carbon nanotube bundles 23 and the first substrate 4. Preferably, the conductive paste layer 3' is made from a conductive paste, such as a silver powder-containing paste, or a carbon powder-containing paste. Preferably, the conductive paste contains nanometallic powders, such as nano-silver powders. Preferably, the conductive paste has a viscosity ranging from 20 kcps to 100 kcps, more preferably, from 30 kcps to 80 kcps.

In addition, the thickness of the conductive paste layer 3' in step (a) should be controlled. When the layer is too thick, the lengths of the carbon nanotube bundles 23 of the vertically aligned carbon nanotube array become too short, thereby undesirably reducing field emission property. When the layer is too thin, the adhesion between the carbon nanotube bundles 23 and the first substrate 4 becomes poor. In addition, the conductive paste layer 3' is formed with an array of confining protrusions 32 protruding therefrom during the pressing action of the second substrate 2 toward the first substrate 4 and tightly confining the free end portions 233 of the carbon nanotube bundles 23. Preferably, the conductive paste layer 3' in step (a) has a thickness ranging from 1 μm to 50 μm. After the solidifying step, the conductive bonding layer 3 has a thickness ranging from 0.5 μm to 10 μm.

The pressure for pressing the second substrate 2 toward the first substrate 4 should be strictly controlled, and is in an amount at least equal to the weight of the second substrate 2. When the pressure is too large, the adjacent carbon nanotube bundles 23 will contact each other due to severe bending. Too small pressure will decrease the adhesion between the carbon nanotube bundles 23 and the first substrate 4. Preferably, the pressure ranges from 0.07 to 0.15 g/cm$^2$, more preferably, from 0.09 to 0.13 g/cm$^2$.

The carbon nanotube of the carbon nanotube bundles suitable for this invention can be single-wall CNT (generally less than 3 μm) or multi-wall CNT. To provide sufficient adhesion, the conductive paste layer 3' in step (a) has a thickness of at least 1 μm. When a single-wall CNT having a length less than 1 μm is used, a spacer (not shown) is placed between the first substrate 4 and the second substrate 2 to prevent the single-wall CNT from being covered by the conductive paste layer 3'.

Figure 7:
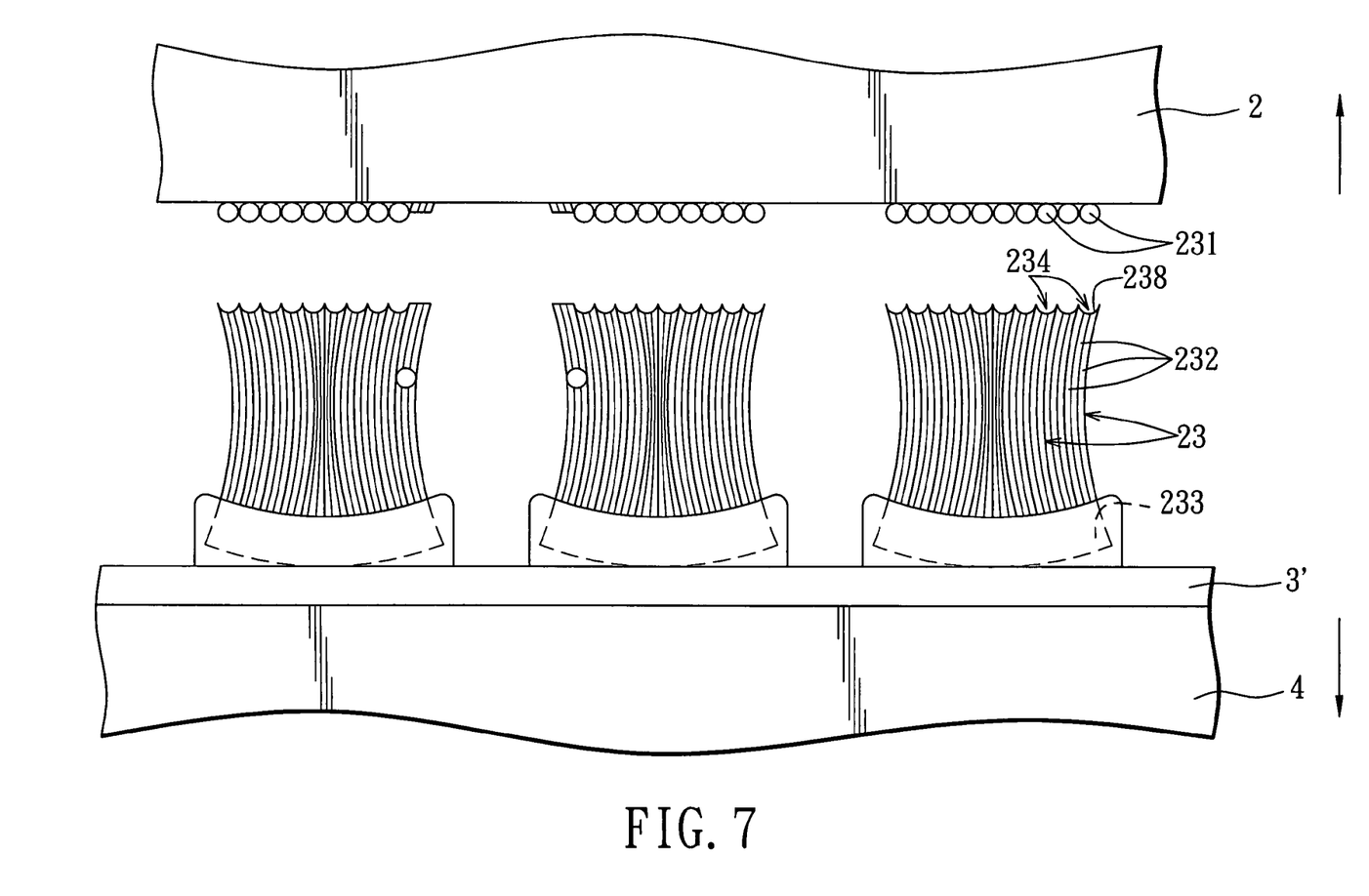

As shown in FIG. 7, during removal of the second substrate 2 from the carbon nanotube bundles 23 fixed to the first substrate 4, islands of the iron catalyst 231 are also removed along with the second substrate 2. Therefore, as shown in FIGS. 8 and 13, an open end portion 234 of each of the carbon nanotube bundles 23 is formed (i.e., forming the open end 238 for each of the carbon nanotubes 232) so as to provide much more emitting sites to thereby improve field emission property.

It should be noted that, for field emission property, a single standing carbon nanotube will provide an excellent field enhancement effect (i.e., increased field enhancement factor, β). When the number of the carbon nanotubes increases, field emission property is deteriorated due to screening effect. The number of CNTs 232 in each of the CNT bundles 23 can be decreased by reducing the area of the block. However, the area cannot be reduced in an unlimited way because a vertically aligned CNT array can not be prepared using present technology when each of the lateral side of the thin film block 22 having a length less than 7 μm is adopted. Hence, the number of the carbon nanotubes 232 should be controlled and can be controlled by adjusting the block area. Preferably, the square block of the preferred embodiments of this invention has an area ranging from 10 μm×10 μm to 400 μm×400 μm.

EXAMPLE 1

The vertically aligned carbon nanotube array element for the field emission cathode device was obtained using the aforesaid method according to this invention, in which the length of the carbon nanotube 232 is 50 μm, the block size is 100 μm×100 μm, the distance between the adjacent two blocks is 100 μm, the conductive paste layer 3' has a viscosity of 50 kcps, a thickness of 25 μm before pressing action, an average thickness of 8 μm after solidifying, and the pressure for the pressing action is 0.11 g/cm$^2$. The solidifying process includes a soft baking step performed at 150° C. for 30 minutes and an annealing step performed at 530° C. using 10 vol % $H_2/(H_2+Ar) \times 100\%$ gas mixture for 30 minutes.

EXAMPLE 2

The vertically aligned carbon nanotube array element of this example is similar to that of Example 1 except that the block size is 200 μm×200 μm.

EXAMPLE 3

The vertically aligned carbon nanotube array element of this example is similar to that of Example 1 except that the block size is 300 μm×300 μm.

EXAMPLE 4

The vertically aligned carbon nanotube array element of this example is similar to that of Example 1 except that the block size is 400 μm×400 μm.

EXAMPLE 5

The vertically aligned carbon nanotube array element of this example is similar to that of Example 2 except that the length of each of the carbon nanotubes 232 is 50 μm.

EXAMPLE 6

The vertically aligned carbon nanotube array element of this example is similar to that of Example 2 except that the length of each of the carbon nanotubes 232 is 80 μm.

EXAMPLE 7

The vertically aligned carbon nanotube array element of this example is similar to that of Example 2 except that the length of each of the carbon nanotubes 232 is 116 μm.

EXAMPLE 8

The vertically aligned carbon nanotube array element of this example is similar to that of Example 2 except that the length of each of the carbon nanotubes 232 is 200 μm.

The field emission measurement of the vertically aligned carbon nanotube array element for each of Examples 1 to 8 was carried out using a Keithley 237 under conditions of $5 \times 10^{-5}$ to $10^{-6}$ Torr, 400 μm space between two electrodes, and 1 to 1100 V bias pressure.

Figure 9:
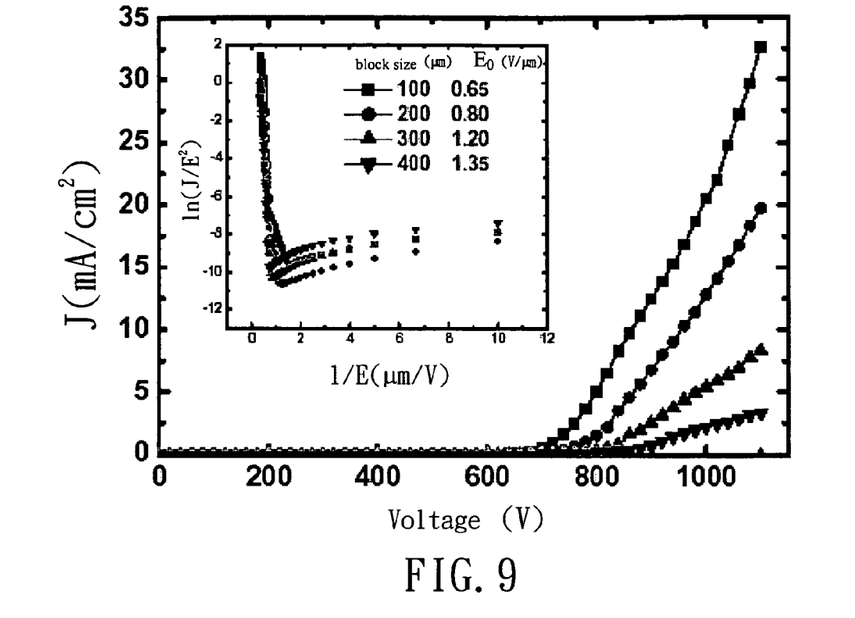
FIG. 9 is a graph showing the relationship between the current density of field emission and the applied voltage for the vertically aligned carbon nanotube arrays of Examples 1 to 4.

Referring to FIG. 9, when the applied voltage is up to 1100 V (i.e., the field intensity is 2.75 V/μm), the current densities (J) of Examples 1 to 4 are 33 mA/cm$^2$, 19 mA/cm$^2$, 8.2 mA/cm$^2$, and 3.3 mA/cm$^2$, respectively. Moreover, the Fowler-Nordheim (FN) plot shown in FIG. 9 shows that the turn-on field intensities ($E_0$, which is defined as the voltage at the lowest point of the FN plot) of Examples 1 to 4 are 0.65 V/μm, 0.80 V/μm, 1.20 V/μm, and 1.35 V/μm, respectively. The results indicate that the field emission property is affected by screening effect so that the turn-on field intensity increases as the block size increases. Compared to the prior art, the field emission property of this invention is superior over that of the prior art.

Figure 10:
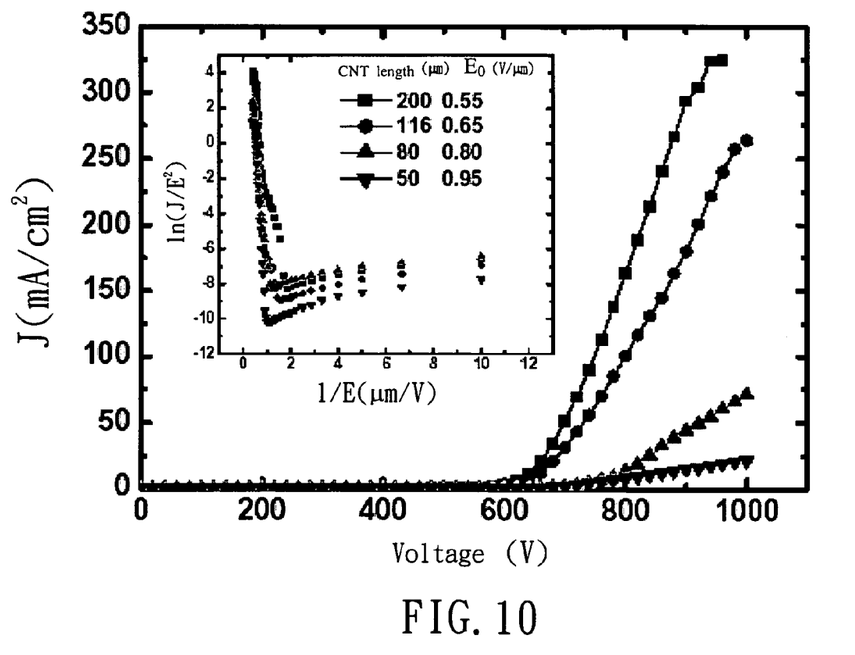
FIG. 10 is a graph showing the relationship between the current density of field emission and the applied voltage for the vertically aligned carbon nanotube arrays of Examples 5 to 8.

As shown in FIG. 10, when the applied voltage is up to 960 V (i.e., the field intensity is 2.4 V/μm), the current densities (J) of Examples 5 to 8 are 19 mA/cm², 60 mA/cm², 240 mA/cm², and 325 mA/cm², respectively. Moreover, the Fowler-Nordheim (FN) plot shown in FIG. 10 shows that the turn-on field intensities ($E_0$) of Examples 5 to 8 are 0.95 V/μm, 0.80 V/μm, 0.65 V/μm, and 0.55 V/μm, respectively. The results indicate that the turn-on field intensity decreases as the length of the carbon nanotube increases. Compared to the prior art, the field emission property of this invention is superior over that of the prior art.

The parameters for the experiments, analytic data, and β value thus obtained are shown in Table 1.

TABLE 1

|  | Block size (μm) | Distance between blocks (μm) | CNT Length (μm) | $E_0$ (V/μm) | Current density (J, mA/cm²) | Field enhancement factor (β) |
|---|---|---|---|---|---|---|
| Exam. 1 | 100 | 100 | 50 | 0.65 | 33[a] | — |
| Exam. 2 | 200 | 100 | 50 | 0.95 | 19[a] | — |
| Exam. 3 | 300 | 100 | 50 | 1.20 | 8.2[a] | — |
| Exam. 4 | 400 | 100 | 50 | 1.35 | 3.3[a] | — |
| Exam. 5 | 200 | 100 | 50 | 0.95 | 19[b] | 2960[c] |
| Exam. 6 | 200 | 100 | 80 | 0.80 | 60[b] | 4149[c] |
| Exam. 7 | 200 | 100 | 116 | 0.65 | 240[b] | 17140[c] |
| Exam. 8 | 200 | 100 | 200 | 0.55 | 325[b] | 20513[c] |

[a] field intensity is 2.75 V/μm
[b] field intensity is 2.40 V/μm
[c] field intensity is 2.40 V/μm According to this invention, using the conductive paste layer 3' formed with the confining protrusions 32 and controlling the viscosity and thickness of the conductive paste layer 3', adhesion between the first substrate 4 and the CNT bundles 23 can be improved. Moreover, by producing the open end 238 for the carbon nanotubes 232 and by controlling the block size and the CNT length, the screening effect can be reduced and the edge effect can be enhanced, as a result, the field enhancement factor (β) is increased significantly so as to improve the field emission property.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for producing a carbon nanotube array element of a field emission cathode device, comprising the steps of:
   providing a first substrate having a surface coated with a conductive paste layer;
   forming an array of thin film blocks of catalyst on a second substrate;
   forming each of the thin film blocks into islands of catalyst on the second substrate;
   forming carbon nanotube bundles on the islands of catalyst on the second substrate, each of the carbon nanotube bundles including a plurality of carbon nanotubes and having a free end portion distal from the second substrate;
   pressing the second substrate toward the first substrate such that the free end portions of the carbon nanotube bundles insert into the conductive paste layer;
   solidifying the conductive paste layer so as to fix the free end portions of the carbon nanotube bundles to the first substrate; and
   removing the second substrate together with the islands of catalyst from the carbon nanotube bundles fixed to the first substrate, thereby forming an open end for each of the carbon nanotubes.

2. The method of claim 1, wherein the conductive paste layer is formed with an array of confining protrusions that protrude therefrom during the pressing action of the second substrate toward the first substrate and that confine the free end portions of the carbon nanotube bundles.

3. The method of claim 1, wherein the conductive paste layer is one of a silver powder-containing paste and a carbon powder-containing paste, and wherein the conductive paste layer contains nanometallic powders.

4. The method of claim 1, wherein the conductive paste layer has a viscosity ranging from 20 kcps to 100 kcps.

5. The method of claim 1, wherein the pressure for pressing the second substrate toward the first substrate ranges from 0.07 to 0.15 g/cm².

6. The method of claim 1, wherein each of the thin film blocks of catalyst has a size ranging from 10 μm×10 μm to 400 μm×400 μm.

* * * * *